Sept. 16, 1969  J. W. DAVIS  3,467,442

VEHICLE ANTISKID BRAKING SYSTEMS

Filed June 30, 1967  3 Sheets-Sheet 1

Sept. 16, 1969  J. W. DAVIS  3,467,442

VEHICLE ANTISKID BRAKING SYSTEMS

Filed June 30, 1967  3 Sheets-Sheet 2

Sept. 16, 1969  J. W. DAVIS  3,467,442

VEHICLE ANTISKID BRAKING SYSTEMS

Filed June 30, 1967  3 Sheets-Sheet 3

United States Patent Office 3,467,442
Patented Sept. 16, 1969

3,467,442
VEHICLE ANTISKID BRAKING SYSTEMS
John Walter Davis, Coventry, England, assignor to The Dunlop Company Limited, Erdington, England, a corporation of Great Britain
Filed June 30, 1967, Ser. No. 650,347
Claims priority, application Great Britain, July 5, 1966, 30,121/66
Int. Cl. B60t 8/02, 9/02
U.S. Cl. 303—21                                    14 Claims

ABSTRACT OF THE DISCLOSURE

A sensitivity control valve for a vehicle antiskid braking system comprising a housing containing a passage having inlet and outlet ports through which pneumatic pressure may flow to operate a mechanism for effecting application of a brake, a restrictor member movable in the passage and spring-urged towards a position in which it provides a relatively small restriction to the flow of air from the inlet port to the outlet port, and means operated by a skid-sensing device for moving the restrictor member to a position in which it provides a relatively great restriction to the said flow of air whenever the system is in operation to check a tendency to skid.

---

This invention relates to vehicle antiskid braking systems of the kind which incorporates a skid-sensing device arranged to release at least one of the brakes of the vehicle whenever an associated wheel is about to lock and skid.

In the antiskid braking system described in the specification of the copending U.K. patent application No. 29,998/65, a vehicle braking system is described which comprises a pneumatic brake operating mechanism having a first working chamber which can be subjected to pneumatic pressure or vacuum from a source thereof under the control of a driver-operated control valve to produce a thrust to apply a brake and a second working chamber which can be supplied with pneumatic pressure or vacuum from a second source to produce a thrust in opposition to the thrust from the first working chamber to effect a reduction in the resultant thrust applied to the brake, an antiskid control valve having a brake-applying position in which it connects the second working chamber to atmosphere and a brake-releasing position in which it connects the second working chamber to the second source of pneumatic pressure or vacuum to cause it to oppose the brake-applying thrust, and a skid-sensing device associated with a wheel of the vehicle and arranged to move the control valve to the brake-releasing position whenever the wheel tends to lock and to permit the return of the valve to the brake-applying position when the tendency for the wheel to lock has been overcome.

The object of the present invention is to provide means for improving the performance of a pneumatically operated antiskid braking system, for example a system of the above kind.

According to the invention a sensitivity control valve for a pneumatically operated vehicle antiskid braking system comprises a housing containing a passage having inlet and outlet ports through which air may flow to operate a mechanism for effecting application of a brake, a restrictor member movable in the passage to provide a variable restriction to the flow of air through the passage, and means for moving the restrictor member to a position where it provides a relatively great restriction whenever the system is in operation to check a tendency to skid and to return the restrictor member to a position in which it provides a relatively small restriction at a predetermined time after the tendency to skid has ceased.

According to the invention also a sensitivity control valve for a vehicle antiskid braking system comprises a housing containing a passage having inlet and outlet ports through which pneumatic pressure may flow to operate a mechanism for effecting application of a brake, a restrictor member movable in the passage and spring-urged towards a position in which it provides a relatively small restriction to the flow of air from the inlet port to the outlet port, and pneumatically operated means for moving the restrictor member to a position in which it provides a relatively great restriction to the said flow of air.

The invention also provides a vehicle antiskid braking system incorporating a sensitivity control valve as defined in either of the two preceding paragraphs.

The invention is applicable to systems operated by pneumatic pressure or vacuum.

Two embodiments of the invention will now be described by way of example, with reference to the accompanying drawings, in which.

Figure 1:
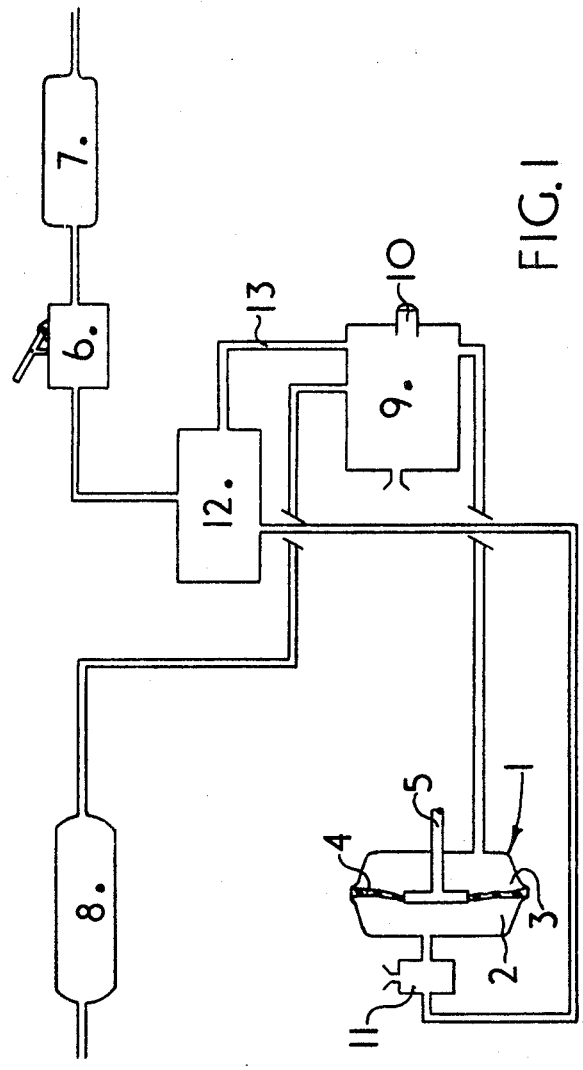
FIGURE 1 is a diagrammatic illustration of a vehicle antiskid braking system incorporating a sensitivity control valve in accordance with the invention.

An antiskid braking system for the tractor portion of an articulated vehicle is described in the specification of the copending U.K. patent application No. 29,998/65, and the system illustrated in FIGURE 1 is of a generally similar kind. This system includes brake operating mechanisms 1, only one of which is shown, which each incorporates a first working chamber 2 and a second working chamber 3 separated from one another by a diaphragm 4 to which a brake operating rod 5 is attached. The first working chamber 2 is supplied with air pressure through a driver's control valve 6 from a service reservoir 7 to operate the brake and the second working chamber 3 can be supplied with air pressure from a second reservoir 8 to release the brake.

An antiskid control valve 9, which can be actuated through a plunger 10 by a conventional rotary-inertia skid-sensing device (not shown), is provided to control the supply of air from the reservoir 8 to the second chamber 3 whenever a skid is imminent, and to connect the second chamber to exhaust when there is no tendency to skid. When air is supplied to the chamber 3 to correct a tendency to skid the diaphragm 4 is moved back into the chamber 2, excess air pressure being vented through a nonreturn balanced exhaust valve 11.

A sensitivity control valve 12 is provided to reduce the rate at which air is supplied to the first chamber 2 for a predetermined period after the antiskid control valve 9 has operated to check a tendency to skid, the valve 12 being operated by pressure supplied through a connector 13 from the valve 9 whenever the valve 9 is operated by the plunger 10.

Figure 2:
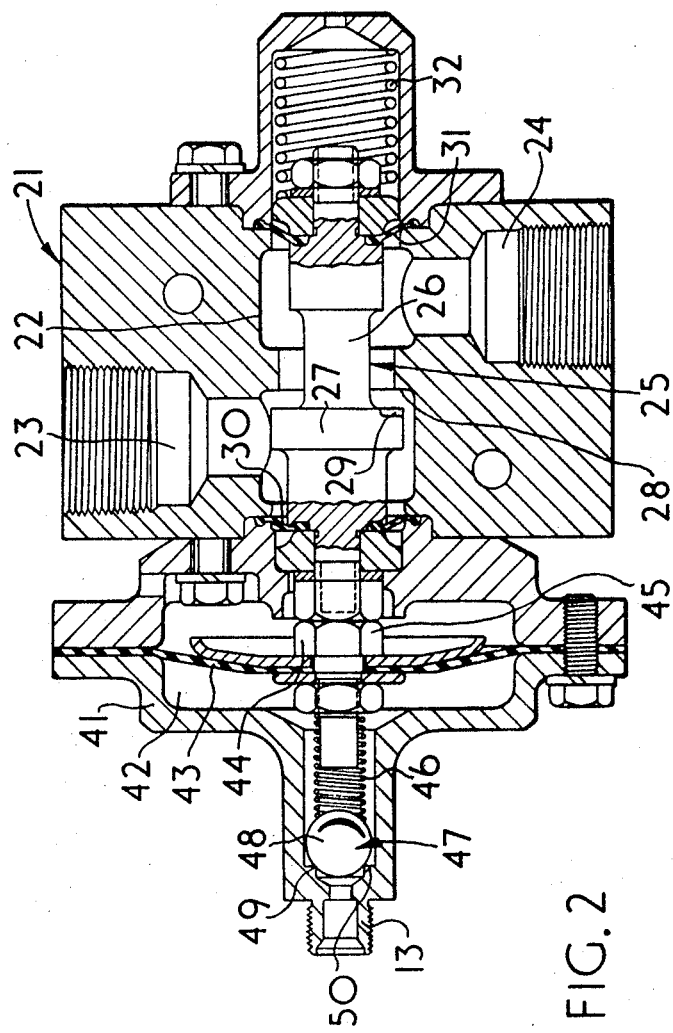
FIGURE 2 is an axial cross-sectional view of a sensitivity control valve.

The sensitivity control valve 12 may, as shown in FIGURE 2 comprise a housing 21 containing a passage 22 having an outlet port 23 connected to the first chamber 2 of the brake-operating mechanism 1 and an inlet port 24 connected to the driver's brake control valve 6, the arrangement being such that air pressure to apply the brakes flows through the passage 22 of the valve from the inlet port 24 to the outlet port 23 past a restrictor member 25. The restrictor member 25 is slidably guided at its ends so as to be movable axially within the passage 22 to provide a variable restriction to the flow of air through the passage, and comprises a valve stem 26 aligned with the passage 22 and having a head 27 for engagement with a valve seat 28 formed in the passage 22 between the inlet port 24 and the outlet port 23. The head 27 is provided with a recess 29 which, when the mating surfaces of the valve head 27 and the seat 28 are in contact, will permit only a restricted flow of air from the inlet port to the outlet port.

The restrictor member 25 is sealed to the wall of the passage 22 by a pair of flexible diaphragm-type seals 30, 31 at opposite ends of the portion of the passage 22 into which the inlet and outlet ports enter. The member 25 is urged by a spring 32 towards the position shown in the drawing in which the valve head 27 is clear of its seat and provides a relatively small restriction to the flow of air from the inlet port to the outlet port.

At the opposite end of the housing 21 to that which contains the spring 32 a pneumatic actuator 41 is secured to the housing 21. The actuator 41 comprises a chamber 42 which is bounded at one side by a flexible diaphragm 43 arranged coaxially with the restrictor member 25 and having a central abutment member in the form of the head of a bolt 44 which is engageable with a corresponding abutment member in the form of a nut 45 secured at one end of the member 25.

The bolt 44 also serves to locate a spring 46 which forms part of a nonreturn valve 47 through which pneumatic pressure can be supplied to the actuator chamber from the connector 13. The valve 47 comprises a head portion in the form of a ball 48 normally urged by the spring 46 into engagement with a seat portion 49, the seat portion 49 having a recess 50 which acts as a bleed orifice to permit a restricted exhaust flow of air from the chamber 42 past the valve 47 and through the connector 13 when the valve 9 ceases to be in an operative condition to check a tendency to skid and opens the passage through the connector 13 to exhaust. The pressure in the chamber 42 can thus leak at a predetermined rate to exhaust following each antiskid operation.

In operation, when a skid is sensed by the skid-sensing device it moves the plunger 10 and thus causes air under pressure to be admitted to the chamber 3 of the brake-operating mechanism 1, thus effecting release of the associated brake. Simultaneously, air pressure is supplied through the connector 13 to the chamber 42 of the actuator 41, and the restrictor member 25 is moved by the actuator to a position in which the head 27 engages the seat 28 and thereafter permits only a restricted flow of air to the chamber 2 of the brake operating mechanism. When the tendency for a skid to occur has been overcome the plunger 10 of the antiskid control valve is released and the chamber 3 of the brake operating mechanism 1 is connected to exhaust. The rise of pressure in the chamber 2 of the actuator is however delayed by the restricting effect of the recess 29 until sufficient time has elapsed for at least one cycle of operation of the antiskid system to take place, thus ensuring that the rate of flow of air to the chamber 2 of the brake operating mechanism is insufficient to cause a significant rise in pressure in the chamber during a period when the antiskid control valve 9 is operating cyclically to apply and release the brakes.

The provision of the sensitivity control valve 12 as described above keeps the pressure in the chamber 2 at a relatively low level on slippery surfaces, even when the driver operates his control valve so as to tend to supply a relatively high pressure in the chamber 2, and thus reduces the amount of air which needs to be supplied to the second chamber 3 of the brake-operating mechanism 1 in a skid-correcting operation. The pressure difference between the second reservoir 8 and the second chamber 3 remains at a high value throughout the operation, and the flow of air through the antiskid control valve to the chamber 3 therefore takes place under a high pressure differential. This enables a smaller antiskid control valve to be used than would be required for passing an air flow at a relatively low pressure differential, as would occur in a situation in which the second chamber 3 had to be raised to a pressure near to that of the second reservoir 8.

Figure 3:
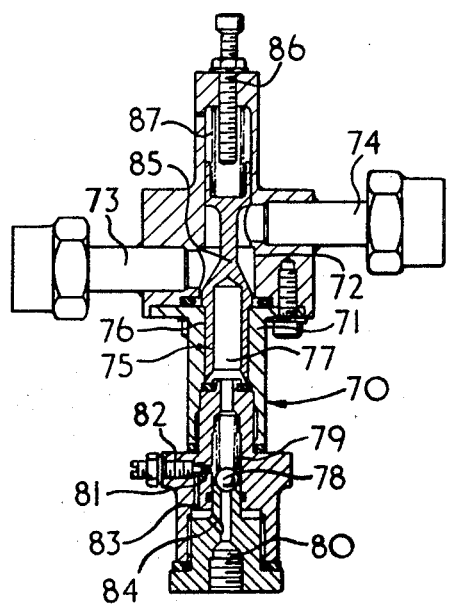
FIGURE 3 is a similar view to FIGURE 2 showing an alternative sensitivity control valve.

The alternative sensitivity control valve 70 shown in FIGURE 3 comprises a housing 71 containing a passage 72 having an outlet port 73 connected to the first chamber 2 of the brake-operating mechanism and an inlet port 74 connected to the driver's brake control valve 6, the arrangement being such that air pressure to apply the brakes flows through the passage 72 of the valve 70 from the inlet port 74 to the outlet port 73 past a restrictor member 75. The restrictor member 75 is slidable within the passage 72 to provide a variable restriction to the flow of air through the passage, and comprises a piston portion 76 which is arranged to be subjected to air pressure at the end 77 of the passage 72 whenever the antiskid control valve operates to check an imminent skid. The end 77 forms a control end of the passage and is connected through a nonreturn valve 78 urged to a closed position by a spring 79, and through a connector 80 (corresponding to the connector 13 of the first embodiment) to the antiskid control valve 12. An orifice 81 which is adjustable in size by means of a tapered needle valve member 82 is connected by passages 83 and 84 to provide a bleed passage which, following an operation of the system to check an imminent skid, when the antiskid control valve 12 returns to the brake-applying position and thus connects the line 80 to exhaust, enables the pressure at the control end 77 of the passage 72 to leak at a predetermined rate to exhaust.

The restrictor member 75 has a waisted central portion 85 of tapering cross-section, which is movable from the position shown in the drawing by pressure at the end 77 of the passage 72 to a position between the inlet and outlet ports in which it provides a relatively great restriction to the flow of air from the driver's control valve 6 to the first chamber of the brake-operating mechanism whenever the antiskid control valve operates and feeds pressures to the end 77 of the passage 72. The opposite end of the passage 72 contains an adjustable stop 86 and a return spring 87 which urges the restrictor member towards a position in which it provides a relatively small restriction, and when the operation of the antiskid control valve to check a skid ceases, thus connecting the line 80 to exhaust, the spring moves the restrictor member 75 towards the position shown in the drawing, the pressure at the end 77 of the passage 72 escaping through the adjustable orifice 81 to exhaust. The size of the orifice 81 thus controls the length of time for which the restrictor member 75 is in the position in which it offers a relatively great restriction, and in this embodiment the orifice is adjustable to provide optimum performance characteristics. Further control of the performance of the valve is provided by adjustment of the stop 86.

The provision of means for adjusting the characteristics of the valve shown in FIGURE 3 renders it particularly useful for use in experimental systems.

In either of the embodiments described above the inlet and outlet ports may be reversed: in the valve shown in FIGURE 2 the port 23 may be the inlet port and the port 24 the outlet port; in FIGURE 3 the port 73 may be the inlet port and the port 74 may be the outlet port.

Although the present invention has been illustrated and described in connection with selected example embodiments, it will be understood that these are illustrative of the invention and are by no means restrictive thereof. It is reasonably to be expected that those skilled in this art can make numerous revisions and adaptations of the invention, and it is intended that such revisions and adaptations will be included within the scope of the following claims as equivalents of the invention.

I claim:

1. A sensitivity control valve for a pneumatically operated vehicle antiskid braking system comprising a housing containing a passage having inlet and outlet ports through which air may flow to operate a mechanism for effecting application of a brake, a restrictor member movable in the passage to provide a variable restriction to the flow of air through the passage, and means for advancing the restrictor member to a first position where it provides a relatively great restriction whenever the system is in operation to check a tendency to skid, and means for returning the restrictor member to a second position in which it provides a relatively small restriction, delay means combined with said restrictor member to regulate the rate at which the restrictor member returns to the second position to be slower than the rate at which the restrictor member is advanced to the first position so that the restrictor member cannot return to the first position until a predetermined time has elapsed after the skid has ceased.

2. A sensitivity control valve for a vehicle antiskid braking system comprising a housing containing a passage having inlet and outlet ports through which pneumatic pressure may flow to operate a mechanism for effecting application of a brake, a restrictor member movable in the passage and spring-urged towards a position in which it provides a relatively small restriction to the flow of air from the inlet port to the outlet port, and pneumatically operated means for advancing the restrictor member to a first position where it provides a relatively great restriction whenever the system is in operation to check a tendency to skid, and means for returning the restrictor member to a second position in which it provides a relatively small restriction, delay means combined with said restrictor member to regulate the rate at which the restrictor member returns to the second position to be slower than the rate at which the restrictor member is advanced to the first position so that the restrictor member cannot return to the first position until a predetermined time has elapsed after the skid has ceased.

3. A sensitivity control valve according to claim 2 wherein the restrictor member comprises a valve stem aligned with the passage and having a head, for engagement in the position where it provides a relatively great restriction, with a valve seat formed in the passage between the inlet port and the outlet port, a channel being provided to permit a restricted flow of air from the inlet port to the outlet port while the valve head is in engagement with its seat.

4. A sensitivity control valve according to claim 3 wherein the channel takes the form of a recess in at least one of the mating surfaces of the valve head and the valve seat.

5. A sensitivity control valve according to claim 2 wherein the restrictor member comprises a waisted central portion of tapering cross-section which is movable to a position between the inlet port and the outlet port in which it provides a relatively great restriction, the movement of the restrictor member being limited by a stop.

6. A sensitivity control valve according to claim 5 wherein the stop is adjustable to enable the maximum restriction offered to the flow of air to be varied.

7. A sensitivity control valve according to claim 2 wherein the restrictor member is slidably supported for axial movement in the passage and is sealed to the wall of the passage by a pair of flexible diaphragm-type seals at opposite ends of the portion of the passage into which the inlet and outlet ports enter.

8. A sensitivity control valve according to claim 2 wherein the pneumatically operated means for moving the restrictor member comprises a chamber formed at one end of the passage and arranged to be supplied with pneumatic pressure through said delay means which includes a nonreturn valve and a bleed orifice being provided to permit the pressure in the chamber to leak away on release of the operating pneumatic pressure.

9. A sensitivity control valve according to claim 8 wherein the bleed orifice consists of a recess formed in a seat portion or a valve head portion of the nonreturn valve.

10. A sensitivity control valve according to claim 8 wherein the bleed orifice is formed separately from the nonreturn valve and is adjustable in size.

11. A sensitivity control valve according to claim 8 wherein the chamber is bounded at one side by a flexible diaphragm which is arranged to transmit an axial thrust to the restrictor member.

12. A sensitivity control valve according to claim 8 wherein the chamber is bounded at one side by a piston portion of the restrictor member, the piston portion being fluid-tightly slidable in the passage.

13. A vehicle antiskid braking system incorporating a sensitivity control valve as defined in claim 1.

14. A vehicle antiskid braking system according to claim 13 wherein the supply of pneumatic pressure to the brake operating mechanism to apply the brake is controlled for antiskid purposes solely by the sensitivity control valve.

References Cited

UNITED STATES PATENTS 3,260,556 7/1966 Packer.
3,306,677 2/1967 Dewar et al.

DUANE A. REGER, Primary Examiner

U.S. Cl. X.R.

188—181

UNITED STATES PATENT OFFICE
CERTIFICATE OF CORRECTION

Patent No. 3,467,442                          September 16, 1969

John Walter Davis

It is certified that error appears in the above identified patent and that said Letters Patent are hereby corrected as shown below:

Column 2, line 32, "the" should read -- our --. Column 4, line 39, "pressures" should read -- pressure --; line 45, "the spring moves" should read -- the spring 87 moves --.

Signed and sealed this 12th day of May 1970.

(SEAL)
Attest:

Edward M. Fletcher, Jr.                      WILLIAM E. SCHUYLER, JR.
Attesting Officer                                Commissioner of Patents